United States Patent Office.

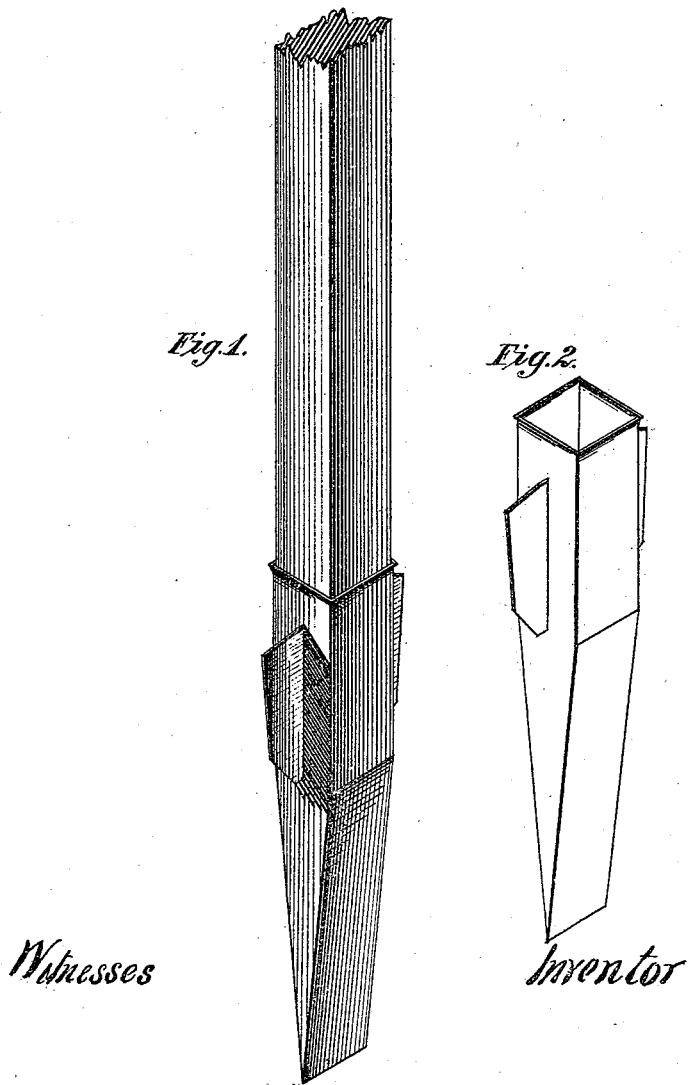

DANIEL FISHER, OF FAIR HAVEN, OHIO.

Letters Patent No. 94,195, dated August 31, 1869.

IMPROVEMENT IN FENCE-POSTS.

The Schedule referred to in these Letters Patent and making part of the same.

Be it known that I, DANIEL FISHER, of Fair Haven, in the county of Preble, and State of Ohio, have invented a new and improved Mode of Setting Fence and other Posts in the Ground, and securing them firmly in position, and preventing the bottom of said posts from rotting or becoming loose in the ground.

The nature of my invention consists of a cast-iron or other metal socket, square at the upper end and wedge-shaped at the lower extremity, with a flange around the upper end of said socket, and two metal flanges, one on each of two sides of said socket, on the square portion thereof, substantially as shown in the drawing.

The flange around the top of said socket forms a cup or receptacle for coal-tar or other preservative of wood after the post is inserted in said socket.

The side flanges are to give said socket more firmness of position when in the ground, so that the fence will offer greater resistance to winds, or any force operating against the fence on either side thereof.

The shape of the socket is such as to enable it to be easily driven into the ground for use.

The drawings hereto annexed exhibit the general outlines of my invention, and also show how the post is inserted in said socket.

In the drawings—

A represents the socket;

b, the flange for the reception of coal-tar, or equivalent material;

f, the side flange or wings; and

B, the fence-post inserted in the socket.

What I claim as my invention, and desire to secure by Letters Patent, is—

The wedge-shaped metal socket, provided with the side flanges, as set forth.

In testimony that I claim said invention as my own, I have hereunto subscribed my name, this 16th day of October, A. D. 1868.

DANIEL FISHER.

Witnesses:
    ISAAC N. SLIVER,
    STILES C. IRELAND.